A

United States Patent
Barnes

(10) Patent No.: US 12,029,170 B2
(45) Date of Patent: Jul. 9, 2024

(54) TRELLIS WITH ELEVATED CROSS MEANS AND HOLDERS

(71) Applicant: NZ TUBE MILLS LIMITED, Lower Hutt (NZ)

(72) Inventor: Paul Barnes, Lower Hutt (NZ)

(73) Assignee: NZ TUBE MILLS LIMITED, Lower Hutt (NZ)

( * ) Notice: Subject to any disclaimer, the term of this patent is extended or adjusted under 35 U.S.C. 154(b) by 0 days.

(21) Appl. No.: 17/522,165

(22) Filed: Nov. 9, 2021

(65) Prior Publication Data

US 2022/0192108 A1 Jun. 23, 2022

(30) Foreign Application Priority Data

Dec. 10, 2020 (NZ) ........................................ 770875

(51) Int. Cl.
*A01G 17/06* (2006.01)
(52) U.S. Cl.
CPC .................................... *A01G 17/06* (2013.01)
(58) Field of Classification Search
CPC .... A01G 17/06; A01G 9/12; A01G 2017/065; A01G 17/04; A01G 17/14; A01G 17/08; E04H 17/12; E04H 17/10; F16G 11/00; E04G 21/1825
USPC .......................................................... 47/76
See application file for complete search history.

(56) References Cited

U.S. PATENT DOCUMENTS

| 675,850 A | * | 6/1901 | Brunneder | A01G 9/12 47/45 |
| 785,259 A | * | 3/1905 | Lieser | E04H 17/12 256/52 |
| 3,140,563 A | * | 7/1964 | Allen | A01G 13/0206 52/63 |
| 3,411,754 A | * | 11/1968 | Fahrenholz | E04H 17/12 256/48 |
| 3,807,089 A | * | 4/1974 | Senese | A01G 17/06 248/219.2 |

(Continued)

FOREIGN PATENT DOCUMENTS

| EP | 1342405 A1 | * | 9/2003 | ............ A01G 17/06 |
| FR | 2991133 A1 | * | 12/2013 | ............ A01G 17/06 |

OTHER PUBLICATIONS

Applicant Has No Information to Disclose: No patent novelty search was performed in this case and neither the Applicant nor the undersigned are aware of any prior art devices or documents which they believe to be material to the invention as claimed. This document is being supplied for informational purposes to the Examiner and is evidence of our desire to comply with the duty of disclosure.

*Primary Examiner* — Brady W Frazier
*Assistant Examiner* — Zoe Tam Tran
(74) *Attorney, Agent, or Firm* — Emerson Thomson Bennett; Daniel A. Thomson

(57) ABSTRACT

A trellis is described herein, including a series of upright posts, cross beams supported by the posts in an elevated state, at least one line holder fitted to each beam, each holder having one or more downwardly facing retaining slot or slots, and vine lines connected to the holders such that they are located in and pass through the retaining slots so that the lines run laterally in rows and can be non-destructively removed from the slots by exerting downward pressure on the lines.

8 Claims, 5 Drawing Sheets

(56) References Cited

U.S. PATENT DOCUMENTS

| | | | | |
|---|---|---|---|---|
| 4,619,440 | A * | 10/1986 | Thevenin | E04H 17/12 |
| | | | | 256/DIG. 5 |
| 5,438,795 | A * | 8/1995 | Galbraith | A01G 17/06 |
| | | | | 256/48 |
| 8,261,460 | B2 * | 9/2012 | Essel | E04G 21/1825 |
| | | | | 33/413 |
| 11,326,718 | B1 * | 5/2022 | Thomas | A01G 17/06 |
| 2013/0118069 | A1 * | 5/2013 | Hunt | A01G 17/14 |
| | | | | 47/46 |
| 2018/0288951 | A1 * | 10/2018 | Di Battista | A01G 17/06 |

* cited by examiner

TRELLIS WITH ELEVATED CROSS MEANS AND HOLDERS

TECHNICAL FIELD

A preferred form of the invention relates to a trellis supporting vine wires.

BACKGROUND

It is known to support vines in the context of horticulture so that they grow in an elevated manner. This is achieved by way of a trellis that incorporates parallel rows of wires on which the vines grow. The vines need to be pruned at least annually to remove old or otherwise unwanted branches. A problem is that this task can be unduly labour intensive or otherwise inefficient due to attachment of the wires to the associated support structure of the trellis.

OBJECT OF THE INVENTION

It is an object of preferred embodiments of the invention to address the above problem, for example by allowing for mechanical pruning. While this applies to preferred embodiments, it should be understood that the object of the invention per se is simply to provide the public with a useful choice. Therefore any objects, advantages or benefits of preferred embodiments should not be read in as limitations on any claims expressed more broadly.

Definitions

The term "comprising" or derivatives thereof, eg "comprises", if and when used in this document in relation to a combination of features or steps should not be taken to rule out the option of there being additional features or steps that have not been mentioned. The term is therefore inclusive, not exclusive.

SUMMARY OF THE INVENTION

According to one aspect of the invention there is a trellis comprising:
- a series of upright posts;
- cross beams supported by the posts in an elevated state;
- at least one line holder fitted to each beam, each holder having one or more downwardly facing retaining slot or slots;
- vine lines connected to the holders such that they are located in and pass through the retaining slots so that the lines run laterally in rows and can be non-destructively removed from the slots by exerting downward pressure on the lines.

Optionally each retaining slot is inclined.

Optionally each retaining slot is substantially dog-legged having an opening and a nesting portion, the opening being angled in a different direction to the nesting portion.

Optionally the vine lines are located in the nesting portions.

Optionally each cross beam has at least two of the holders fitted and at least two of the retaining slots arranged such that the opening of each angles towards the opening of the other.

Optionally the retaining slots are each generally in the shape of an inverted V or an inverted U.

Optionally there is a series of supplementary lines extending upwards and away from the rows of vine lines and/or the cross beams, and wherein new vine shoots are supported along the supplementary lines.

Optionally the supplementary lines angle upwards.

Optionally the supplementary lines converge to a position above the cross beams.

Optionally each holder comprises a sleeve extending around a respective one of the beams.

Optionally each sleeve has one or more of the downwardly facing retaining slots.

DRAWINGS

Some preferred embodiments of the invention will now be described with reference to the accompanying drawings, of which:

DETAILED DESCRIPTION

Figure 1:
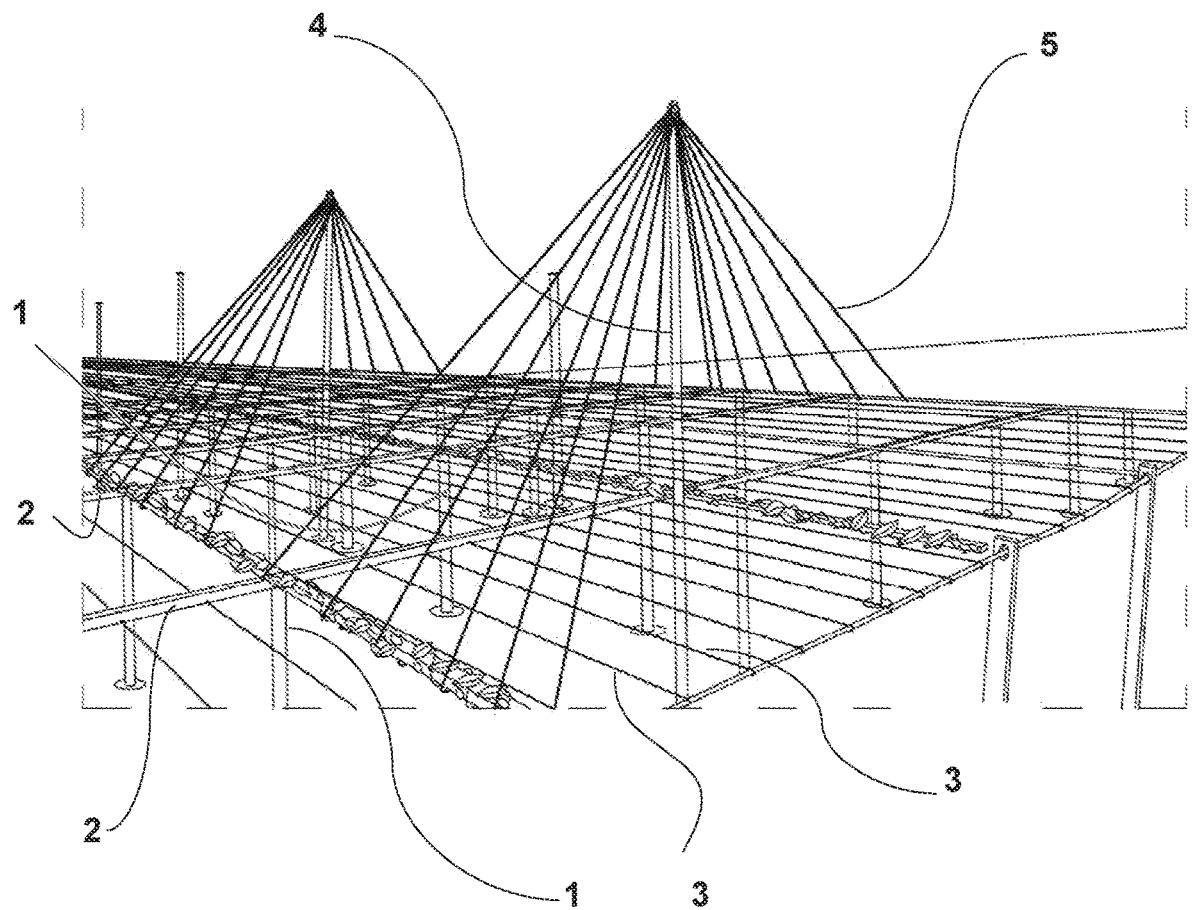
FIG. 1 is an isometric view of a vine trellis in use supporting a series of growing vines.

Referring to FIG. 1, the trellis is arranged in an orchard and supports growing kiwifruit vines. The trellis has rows of upright vine posts 1 supporting rows of horizontal cross beams 2. As shown, the posts 1 of neighbouring rows are connected by the cross beams to provide an overall lattice structure. Parallel rows of vine lines, in this case horizontal wires 3, are held elevated by the cross beams. The arrangement is such that the vines grow along and across the wires 3, supported thereby, well above ground level. The cross beams 2 that run parallel with the wires 3 support main trunk branches of the vine, and the cross beams that run at right angles to the wires 3 support vine branches that extend to the side of the main trunk.

With further reference to FIG. 1, the trellis has rows of 'tepee posts' 4 associated with some of the shorter vine posts 1. Each tepee post 4 is preferably arranged against a respective vine post 1 but, as indicated, the tepee posts 4 are more spaced so that not every vine post is associated with a tepee post 4. Supplementary lines, for example diagonal wires 5 extend upwards and away from some of the wires 3 and some of the cross beams 2 and are anchored at the top of a respective tepee post 4 (generally in the shape of a tepee). The arrangement is such that new shoots (not shown) of the vine are trained to grow upwards along the diagonal wires 5 so that they are out of the way when old branches of the vine branches are pruned or otherwise stripped off the horizontal wires 3. After such pruning the new shoots are moved down to the horizontal wires 3, and continue to grow there for the next season's crop of fruit. The supplementary lines converge to a position above the cross beams 2. The supplementary lines may angle upwards.

Figure 2:
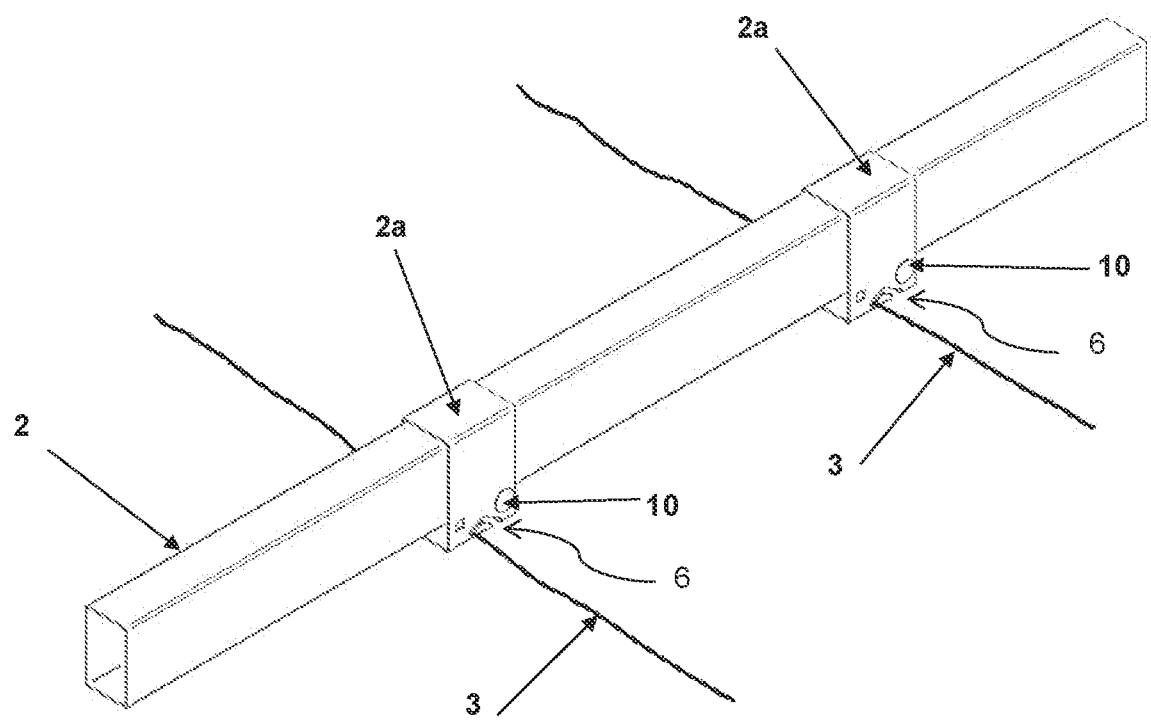
FIG. 2 is an isometric view of part of a cross beam, with two line holders fitted, forming part of the trellis.

Referring to FIG. 2, the wires 3 are attached to the cross beams 2 by way of a series of line holders which in this embodiment shown comprise sleeves 2a. Preferably the cross beams 2 have a rectangular cross section and are hollow. The sleeves are fitted to the beams 2 by being slid into position along the cross beams 2 during construction of the trellis and serve to hold the wires adjacent to the underside of the cross beams 2. As illustrated, the wires 3 are held in downwardly facing retaining slots 6 that form part of the sleeves 2a. The retaining slots are each generally in the shape of an inverted V or an inverted U. The sleeves 2a are slightly oversize with respect to the cross beams 2 so that the slots 6 are below the cross beams 2. Bolts 10 are used to keep the sleeves 2a at the correct position along the cross beams 2. The wires 3 pass completely through each sleeve 2a when they are attached.

Figure 3:
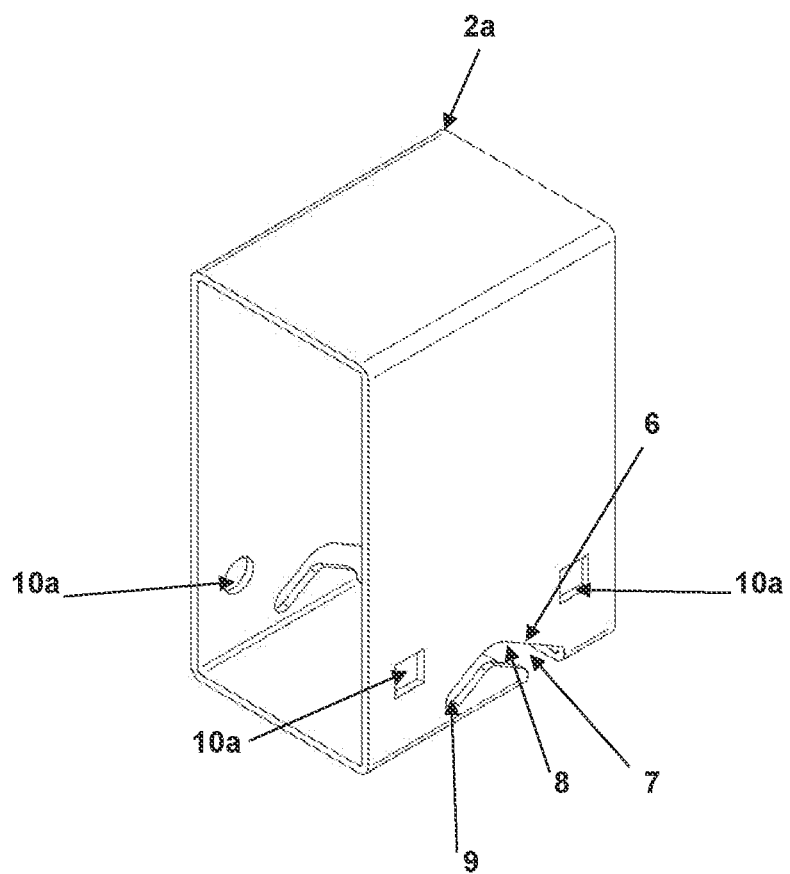
FIG. 3 is an isometric view of one of the line holders showing detail of its retaining opening.

FIG. 3 illustrates detail of one of the sleeves 2a. Each of the retaining slots 6 has a downwards facing opening 7, a channel 8 that extends up and down in a substantially dog-legged manner, and a nesting portion 9. Each retaining slot 6 is therefore inclined. In an alternative embodiment of the invention there may be more than one of the slots 6 on each of the sleeves 2a. The bolts 10 are passed through one or more sleeve openings 10a. The wires 3 are positioned in the nesting portion 9 of each of the slots 6.

Figure 4:
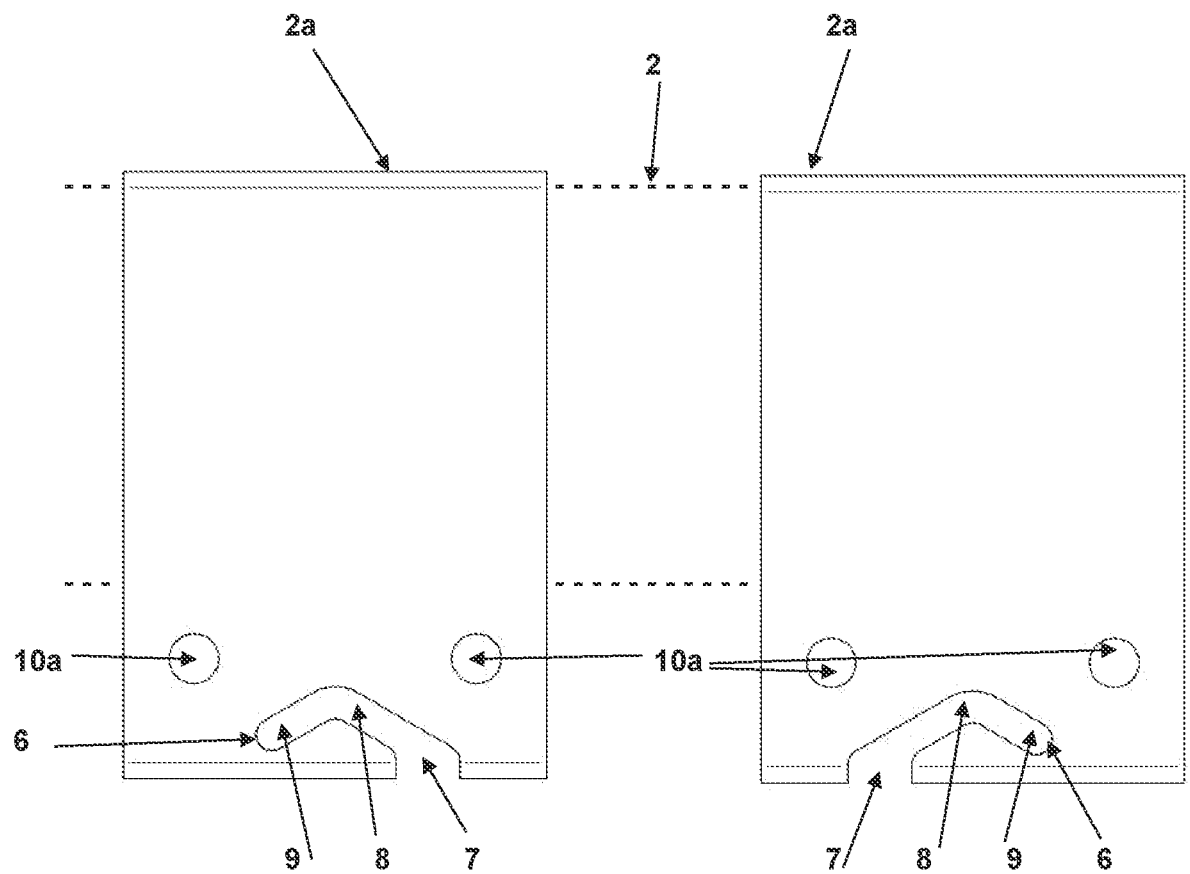
FIG. 4 is a side elevational view of two lines holders.

FIG. 4 illustrates two sleeves 2a positioned on one of the cross beams 2. The lower part of each of the sleeves 2a comprising the retaining slot 6 extends below the level of the bottom of the beams 2 so that wires 3 may be positioned in each of the slots 6 without obstruction by the beams 2. In the preferred embodiment four sleeves 2a are fitted to each of the beams 2, although the number may be greater, for example, six sleeves 2a.

As shown in FIG. 4, the opening of the two most central of the retaining slots angle down towards one another, and the nesting portions 9 of their doglegged channels face away from one another. The retaining slots 6 either side the most central ones are angled in similar relationship to one another. The generally inward angle of the retaining slot 6 means that for pruning the wires can be conveniently pulled inwards towards one another for release from the cross beams 2.

When the horizontal wires 3 are attached in the retaining slots they locate at the nesting portion 9 of the associated channel 8. To attach each wire 3 to its cross beam 2 it must be moved up into the opening 7, then up along the first part of the channel 8, and then down along the channel 8 to the nesting portion 9. To release each wire 3 from the cross beam 2 the wire is moved in the opposite direction. Because release of the wires 3 requires a deliberate up and down movement, they are securely retained and are not able to fall away from the cross beams under gravity.

The cross beams that run parallel to the horizontal wires, being those that support main trunk branches, need not have sleeves with retaining slots 6, but they can do if desired.

Figure 5:
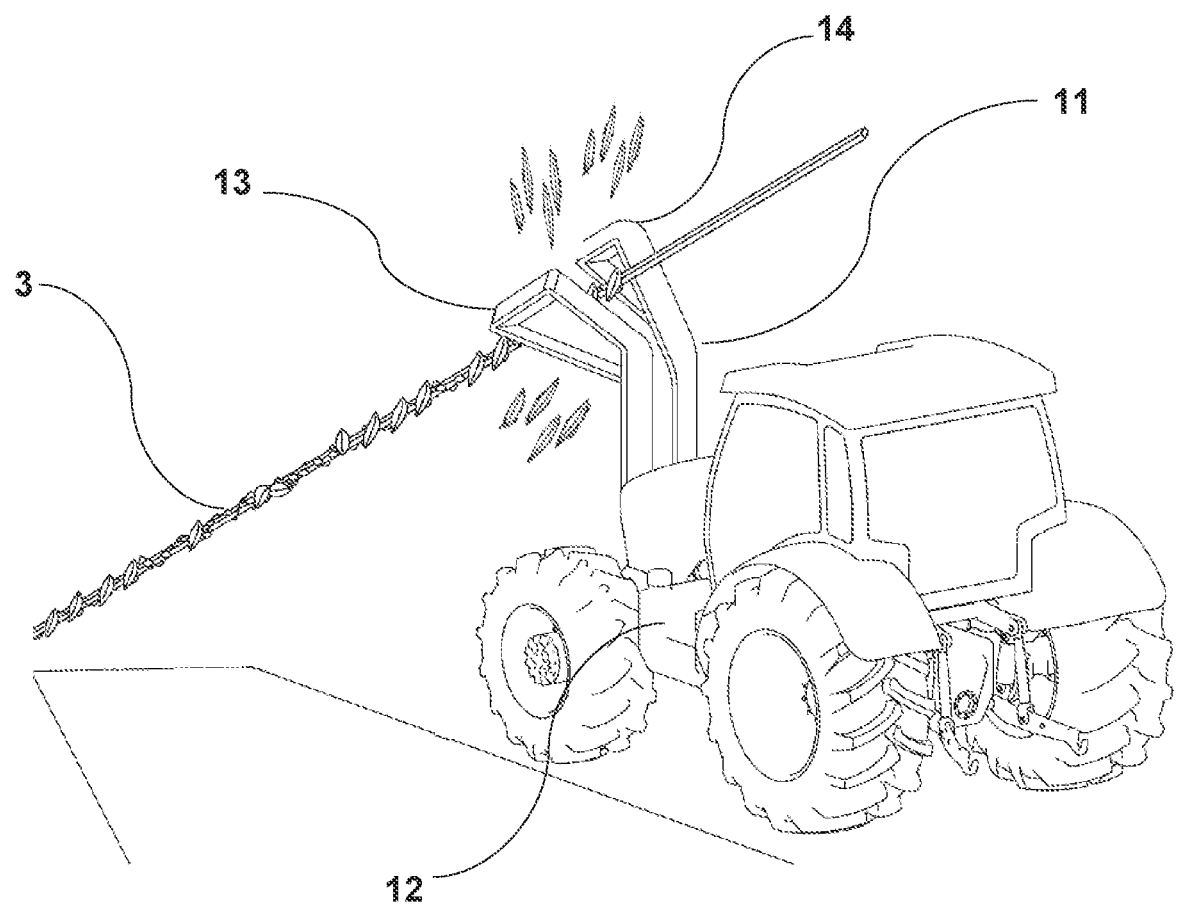
FIG. 5 shows vines that have grown on the trellis being pruned away.

Referring to FIG. 5, when it is time to prune the vine the horizontal wires 3 are released from the retaining slots 6 of the cross beams. This can be done by exerting downward pressure on the wires 3 so that the wires 3 can be non-destructively removed from the slots 6. A pruning machine 11 supported by a tractor 12 clamps the wires 3 between its jaws 13, 14 and, driven by the tractor, runs along the wires 3, stripping away the old branches (those that extend outwards from the main trunk of the vine) as it goes. When the pruning has been done, in other words when the old branches have been stripped away, the wires 3 are again secured in the retaining slots ready to receive the new vine shoots.

While the trellis has been described in relation to a kiwifruit orchard the same arrangement can be used with other types of fruit bearing vines.

In the preferred embodiment of the invention, the line holders are sleeves 2a. However other line holders could be used. For example, each line holder may comprise a plate fixed to the beam 2 on one side only, or may comprise a bracket fixed to the beam 2 on two or more sides. Alternatively, the line attachment means may comprise a clip that can be attached to the beam 2. In other embodiments of the invention the line holder may comprise a clasp, a hook, a fastener, a casing, a link, or some other suitable apparatus for supporting the wires 3.

In terms of disclosure, this document hereby discloses each item, feature or step mentioned herein in combination with one or more of any of the other items, features or steps disclosed herein, in each case regardless of whether the combination is claimed.

While some preferred embodiments of the invention have been described by way of example it should be understood that modifications and improvements can occur without departing from the scope of the following claims.

The invenion climed is:

1. A trellis comprising:
a series of upright posts;
cross beams supported by the posts in an elevated state;
a series of line holders fitted to each cross beam, wherein each line holder has a first side and a second side, wherein the first side is opposite and substantially parallel to the second side, wherein each of the first and second sides having at least one downwardly facing retaining slot, the at least one downwardly facing retaining slot having an opening, a channel, and a nesting portion arranged such that the openings of the downwardly facing retaining slots on the first sides of two of the line holders are angled in opposite directions to each other and the openings of the downwardly facing retaining slots on the second sides of the two line holders are angled in opposite directions to each other; and
vine lines connected to the holders such that they are located in and pass through the nesting portions of the downwardly facing retaining slots so that the vine lines run laterally in rows and can be non-destructively removed from the downwardly facing retaining slots by exerting downward pressure on the vine lines, wherein at least one of the line holders is positioned on one of the cross beams, wherein a gap between one of the cross beams and a bottom of the at least one line holder allows at least one vine line to be placed into the nesting portion.

2. A trellis according to claim 1, wherein each of the openings are angled in a different direction to the nesting portion.

3. A trellis according to claim 1, wherein the retaining slots are each generally in the shape of an inverted V or an inverted U.

4. A trellis according to claim 1, comprising a series of supplementary lines extending upwards and away from the rows of vine lines and/or the cross beams, and wherein vine shoots are supported along the supplementary lines.

5. A trellis according to claim 4, wherein the supplementary lines angle upwards.

6. A trellis according to claim 4, wherein the supplementary lines converge to a position above the cross beams.

7. A trellis according to claim 1, wherein the series of line holders are sleeves extending around a respective one of the cross beams.

8. A trellis according to claim 1, wherein the downwardly facing retaining slots on the first sides are mirror images of the downwardly facing retaining slots on the second sides.

* * * * *